(12) United States Patent
Xia et al.

(10) Patent No.: US 11,991,069 B2
(45) Date of Patent: May 21, 2024

(54) DYNAMIC AGGREGATE ID BASED FLOW METRICS AGGREGATION

(71) Applicant: Cisco Technology, Inc., San Jose, CA (US)

(72) Inventors: Hongbo Xia, Shanghai (CN); Xiaorong Wang, Shanghai (CN); Jianda Liu, Shanghai (CN); Yicheng Liu, Shanghai (CN); Jiayi You, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/090,264

(22) Filed: Dec. 28, 2022

(65) Prior Publication Data
US 2024/0056384 A1     Feb. 15, 2024

Related U.S. Application Data

(60) Provisional application No. 63/397,086, filed on Aug. 11, 2022.

(51) Int. Cl.
*H04L 45/00* (2022.01)
*H04L 45/12* (2022.01)
*H04L 45/24* (2022.01)

(52) U.S. Cl.
CPC .......... *H04L 45/245* (2013.01); *H04L 45/123* (2013.01); *H04L 45/38* (2013.01)

(58) Field of Classification Search
CPC ..................................................... G06F 9/542

USPC ......................................................... 709/201
See application file for complete search history.

(56) References Cited

U.S. PATENT DOCUMENTS

| | | | |
|---|---|---|---|
| 7,434,045 B1 | 10/2008 | Enderwick | |
| 2006/0104308 A1 | 5/2006 | Pinkerton | |
| 2019/0020684 A1 | 1/2019 | Qian | |
| 2020/0120078 A1 | 4/2020 | Mao | |
| 2021/0200431 A1* | 7/2021 | Xiao ................... | G06F 3/04883 |

FOREIGN PATENT DOCUMENTS

WO    WO2022143399    7/2022

* cited by examiner

*Primary Examiner* — Brian Whipple
(74) *Attorney, Agent, or Firm* — Lee & Hayes P.C.

(57) ABSTRACT

Techniques and architecture are described grouping various sources of traffic within a network into grouping fields and assigning each combination of grouping field values an aggregate identification (ID). A first hop edge router may receive a packet and search a mapping table for a corresponding aggregate ID for the combination of grouping field values within the mapping table. If not found, the first hop edge router may assign a corresponding aggregate ID for the combination of grouping field values and store the new aggregate ID for the combination of grouping field values in the mapping table. The first hop edge router may forward the packet on through the network with the aggregate ID embedded in metadata. Routers within the network may measure and aggregate flow metrics of the packet within the network based on the aggregate ID and provide the measurements to the network controller.

20 Claims, 5 Drawing Sheets

FIG. 1

| Aggregate ID 204 | Grouping Fields 202 | | | | | |
|---|---|---|---|---|---|---|
| | VPN | Application | Domain | SGT | Username | User Group |
| 1 | 100 | CISCO-WEBEX | WEBEX.COM | 1 | ALICE | MARKETING |
| 2 | 100 | CITRIX | CITRIX.COM | 1 | ALICE | MARKETING |
| 3 | 200 | CISCO-WEBEX | WEBEX.COM | 2 | BOB | ENGINEERING |
| 4 | 200 | RTP-AUDIO | M.MEDIA-AMAZON.COM | 2 | BOB | ENGINEERING |
| 5 | 200 | UNKNOWN | C.AMAZON-ADSYSTEM.COM | 2 | BOB | ENGINEERING |
| 6 | 200 | UNKNOWN | APIS.GOOGLE.COM | 2 | BOB | ENGINEERING |
| 7 | 200 | CISCO-WEBEX | WEBEX.COM | 2 | JIM | ENGINEERING |
| ... | ... | ... | ... | ... | ... | ... |

DYNAMIC AGGREGATE ID BASED FLOW METRICS AGGREGATION

CROSS-REFERENCE TO RELATED APPLICATION

This patent application claims priority to U.S. Provisional Patent Application No. 63/397,086, filed Aug. 11, 2022, which is fully incorporated herein by reference.

TECHNICAL FIELD

The present disclosure relates generally to aggregating network traffic flow metrics in a network, and more particularly, to aggregating network traffic flow metrics in a network based on grouping fields and corresponding aggregate IDs.

BACKGROUND

Network users are often interested in various aggregated level traffic performance, e.g., flow metrics. However, it is currently difficult to obtain aggregated flow metrics. Thus, it is difficult to provide aggregate level performance visibility with respect to network traffic flow. Generally, it is necessary to obtain individual flow metrics and then separately aggregate them at a central network component. Furthermore, it currently is not possible to obtain aggregated flow metrics based a network based on a combination of traffic origins, e.g., virtual private network (VPN), application, domain, username, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure describes techniques and architecture for grouping various key fields (sources) of traffic within a network, e.g., virtual private network (VPN), security group tag (SGT), application, domain, prefix, username, user group, etc., into grouping fields and assigning each combination of grouping field values an aggregate identification (ID). In particular, a first hop edge router of the network may receive a first packet that originated from fields of traffic that make up grouping field values (also referred to as an attribute group herein). The grouping fields may be configured by a network controller. The network controller may configure the grouping fields based on user input. The first hop edge router may search a mapping table that the first hop edge router maintains for the combinations of grouping field values of the packet. If the combination of grouping field values is not located within the mapping table, then the first hop edge router may assign a new aggregate ID to the new combination of grouping field values and store the aggregate ID with the combination of grouping field values in the mapping table. If the combination of grouping field values is found within the mapping table, then the first hop edge router will obtain a corresponding aggregate ID within the mapping table for the combination of grouping field values. The first hop edge router may then encapsulate the aggregate ID into metadata of the packet and forward the packet on through the network. Other routers within the network may measure and aggregate flow metrics of the packet within the network based on the aggregate ID and provide the measurements to the network controller.

As an example, a method may include receiving, at a first hop edge router of a network, a first packet comprising a first attribute group, wherein attributes of the first attribute group relate to transmission source attributes for the first packet. The method may also include searching, by the first hop edge router of the network, a mapping table of attribute groups, wherein the mapping table of attribute groups stores attribute groups and a corresponding aggregate identification (ID) corresponding to a particular attribute group. The method may further include based at least in part on not locating the first attribute group in the mapping table, assigning, by the first hop edge router of the network, a first aggregate ID to the first attribute group. The method may additionally include storing, by the first hop edge router of the network, the first aggregate ID with the first attribute group in the mapping table. The method may also include encapsulating, by the first hop edge router of the network, the first aggregate ID into metadata of the first packet. The method may further include forwarding, by the first hop edge router of the network, the first packet to a second router of the network. The method may also include decapsulating, by the second router of the network, the metadata of the first packet to obtain the first aggregate ID. The method may additionally include based at least in part on the first aggregate ID, aggregating, by the second router of the network, first metrics related to the first attribute group. The method may further include forwarding, by the second router, the first metrics to a network controller.

Example Embodiments

In accordance with configurations, various key fields (sources) of traffic may be grouped within a network, e.g., virtual private network (VPN), security group tag (SGT), application, domain, prefix, username, user group, etc., into grouping fields and each combination of grouping field values may be assigned an aggregate identification (ID). In particular, a first hop edge router of the network may receive a first packet that originated from fields of traffic that make up a grouping field. The grouping fields may be configured by a network controller. The network controller may configure the grouping fields based on user input. The first hop edge router may search a mapping table that the first hop edge router maintains for the combination of grouping field values of the packet. If the combination of grouping field values is not located within the mapping table, then the first hop edge router may assign a new aggregate ID to the combination of grouping field values and store the aggregate ID with the combination of grouping field values in the mapping table. If the combination of grouping field values is found within the mapping table, then the first hop edge router will obtain a corresponding aggregate ID for the combination of grouping field values within the mapping table.

In configurations, the first hop edge router may encapsulate metadata within the packet and include the aggregate ID. The first hop edge router may then forward the packet to another router. The second router may decapsulate the packet and obtain the aggregate ID. The second router may measure/aggregate flow metrics with respect to the packet with respect to the aggregate ID. The second router may then forward the packet to another router as a flow other direction packet. The traffic flow other direction packets may also be forwarded from the second router back to the first hop edge router. Each time a packet arrives at a router, the router may decapsulate the packet and obtain the aggregate ID. The routers may measure the flow metrics and aggregate them with respect to the aggregate ID. Each router may forward the aggregated metrics for the packet to the network controller, which may then correlate the flow metrics for the network with respect to the aggregate ID and thereby the grouping fields. The network controller may display the metrics and display the results in various manners such as, for example, tables, graphs, etc.

In configurations, the first hop edge router may receive the first packet back from the second router. The first hop edge router of the network may aggregate second metrics related to the first attribute group and forward the second metrics to the network controller.

In some configurations, the second router may encapsulate the first aggregate ID into metadata of the first packet and forward the first packet to a third router of the network. The third router may decapsulate the metadata of the first packet to obtain the first aggregate ID and based at least in part on the first aggregate ID. The third router may aggregate third metrics related to the first attribute group and forward the third metrics to the network controller In some configurations, the network controller may correlate the first metrics, second metrics, and third metrics.

In configurations, the first hop edge router may receive a second packet comprising a second attribute group, wherein attributes of the second attribute group relate to transmission source attributes for the second packet. The first hop edge router may search the mapping table of attribute groups. Based at least in part on locating the second attribute group in the mapping table, the first hop edge router may encapsulate a second aggregate ID into metadata of the second packet from the mapping table, wherein the second aggregate ID corresponds to the second attribute group and forward the second packet to the second router. The second router may decapsulate the metadata of the second packet to obtain the second aggregate ID and based at least in part on the second aggregate ID, the second router may aggregate second metrics related to the second attribute group.

In configurations, the attributes comprise one or more of virtual private network (VPN), application, domain, security group tag (SGT), username, or user group. In configurations, the first and second metrics comprise one or more of jitter, delay, client network delay, server network delay, or packet loss. In configurations, the first and second metrics are measured by at least one of timestamps or counters.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
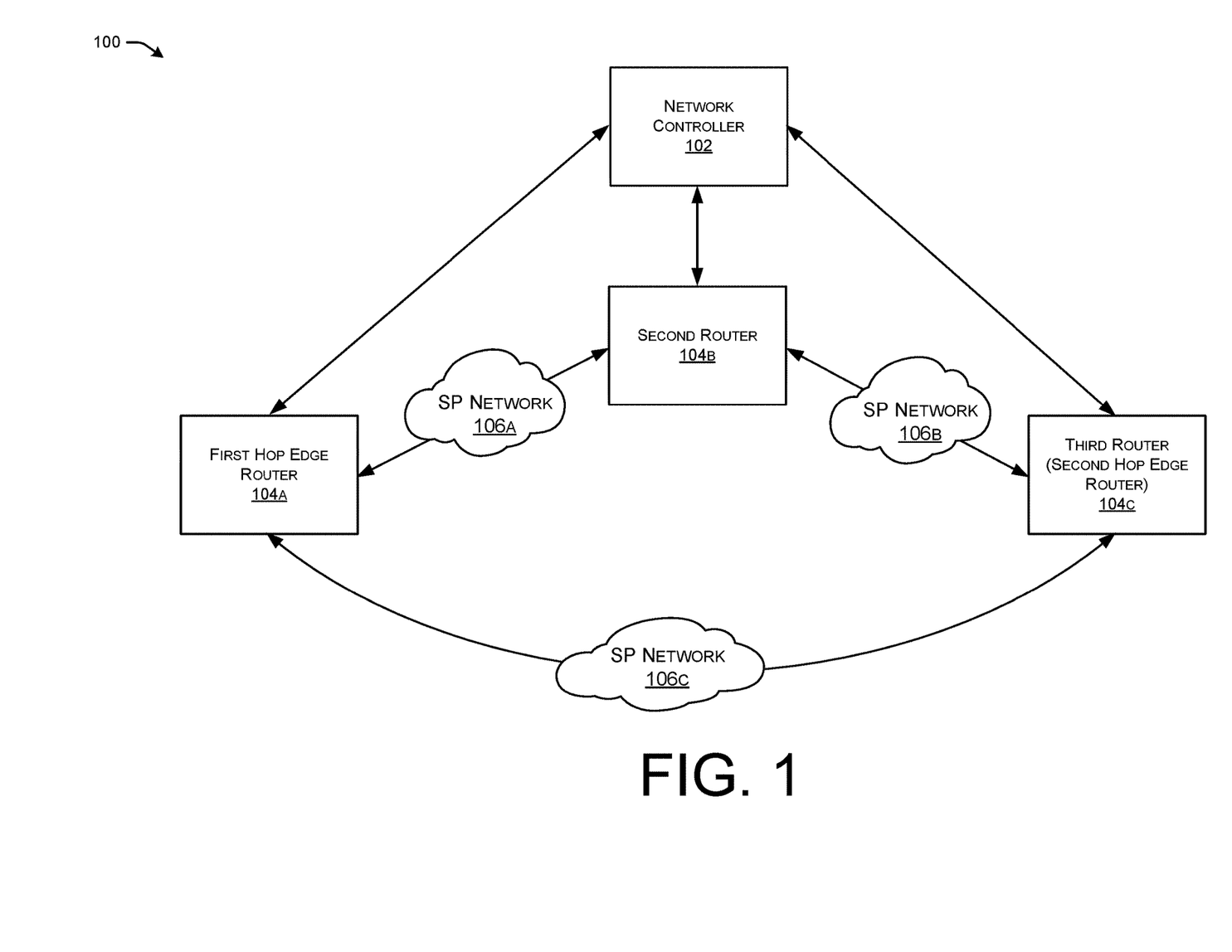
FIG. 1 schematically illustrates an example of a portion of a network where flow metrics in the network may be aggregated based on grouping fields and aggregate IDs, in accordance with the techniques and architecture described herein.

FIG. 1 schematically illustrates an example portion of a network 100. The example portion of the network 100 includes a network controller 102 and three routers 104a, 104b, and 104c. As is known, more routers 104 are generally included within a network. The first router 104a may be referred to as a first hop edge router. The second router 104b and the third router 104c may be general routers within the network 100. In configurations, one or both of the routers 104b, 104c may be a hop edge router. In the example of FIG. 1, router 104c serves as a second hop edge router.

The routers 104a, 104b, 104c may be coupled by service provider (SP) networks 106a, 106b, 106c that provide communication between the routers 104a, 104b, 104c. The SP network 106a may couple the first hop edge router 104a with the second router 104b via a wide area network (WAN). The SP network 106b may couple the second router 104b with the third router 104c via a WAN. The SP network 106c may couple the first hop edge router 104 with the third router 104c via a WAN. In configurations, the edge hop routers 104a and 104c may communicate with local area networks (LAN).

In configurations, the network controller 102 may configure network policy to filter interested traffic. The network controller 102 may also configure grouping fields for packets. The grouping fields may be defined by a user. The grouping fields may include one or more of, for example, virtual private network (VPN), application, prefix, security group tag (SGT), domain, username, user group, etc.

When the first hop edge router 104a receives packets, the first hop edge router 104a may filter the traffic based upon, for example, user configured policy to track and group interested traffic.

After the filtering, in configurations, the first hop edge router 104a may then determine the grouping field values (also referred to herein as an attribute group) of the packets. The first hop edge router 104a may dynamically maintain a mapping table for aggregate IDs for the various grouping field values. Upon receipt of a packet, the first hop edge router may search the mapping table for an aggregate ID that corresponds to the combination of grouping field values of the packet. If a corresponding aggregate ID is not located in the mapping table, then the combination of grouping field values of the packet is new. Thus, the first hop edge router 104a may use an allocated aggregate ID directly located in the mapping table that is associated with the combination of grouping field values or may allocate an aggregate ID for a new combination of grouping field values.

In configurations, the first hop edge router 104a dynamically maintains the mapping table and also exports the mapping to the network controller 102. For example, referring to FIG. 2, an example mapping table 200 is illustrated. In the example mapping table 200, the grouping fields 202 may include VPN, application, domain, SGT, username, and user group. In configurations, grouping fields may also include prefix. An aggregate ID 204 may be assigned based upon the actual values of the grouping fields 202. For example, aggregate ID 1 may be assigned to VPN 100, application cisco-webex, domain webex.com, SGT 1, username Alice and user group marketing. Aggregate ID 2 may be assigned to VPN 100, application Citrix, domain citrix.com, SGT 1, username Alice, and user group marketing. Aggregate ID 3 may be assigned to VPN 200, application cisco-webex, domain webex.com, SGT 2 username Bob, and user group engineering. In configurations, a user may flexibly customize the grouping fields and combinations of grouping fields via the network controller 102.

Figure 2:
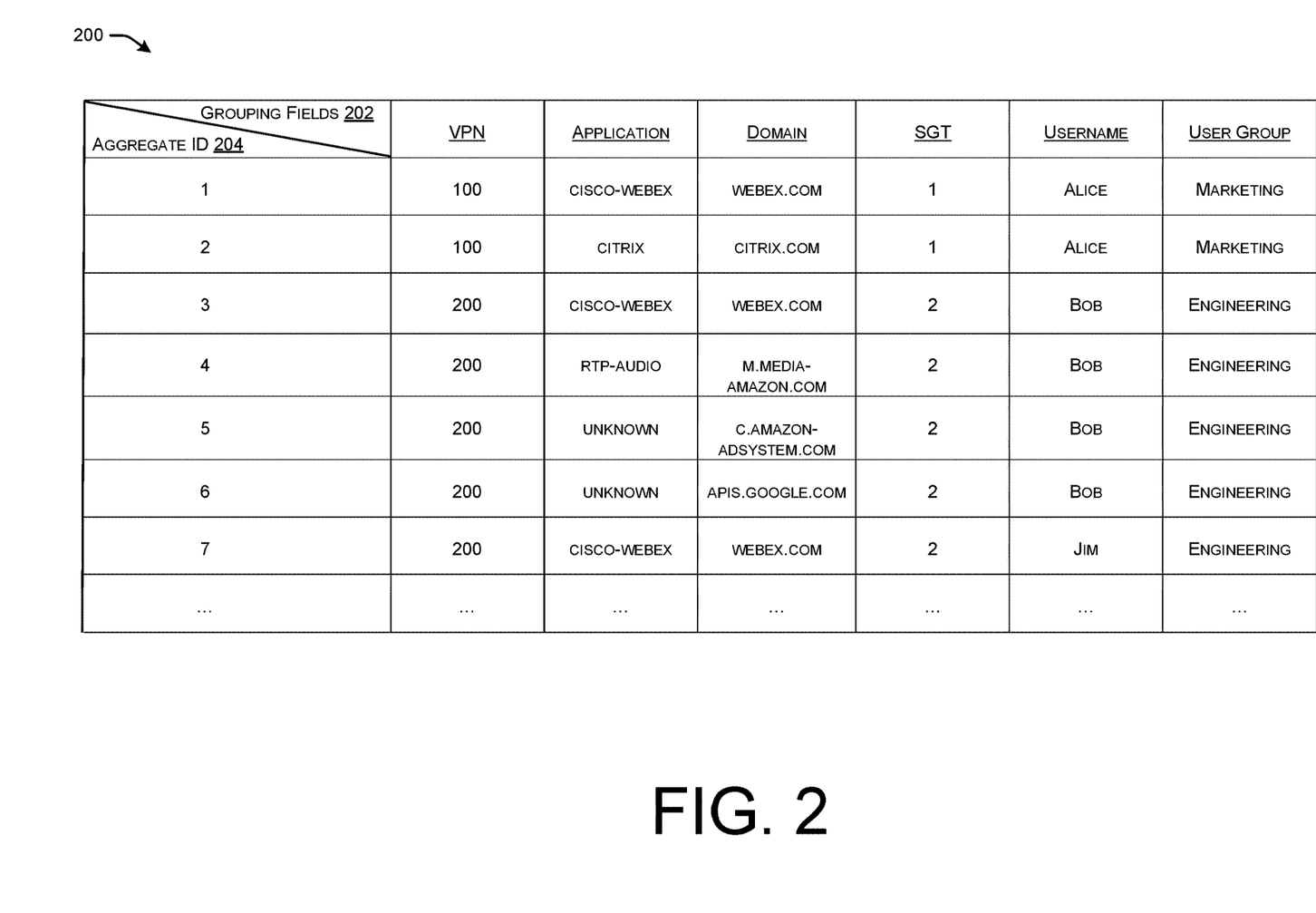
FIG. 2 schematically illustrates an example of a mapping table for storing combinations of grouping field values and corresponding aggregate IDs, in accordance with the techniques and architecture described herein.

When the first hop edge router 104a receives a packet that has new grouping field values, when the first hop edge router 104a searches the mapping table 200, the first hop edge router 104a will not locate a corresponding aggregate ID 204. Thus, the first hop edge router 104 may assign a new aggregate ID 204 for the particular grouping field values of the received packet. For example, if the packet has VPN 200, application cisco-webex, domain webex.com, SGT 2, username Jim, and user group engineering, then the first hop edge router 104a may assign a new aggregate ID 204, e.g., aggregate ID of 7 to this new unique combination of grouping field values. Thus, on the network first hop device, the network first hop device dynamically allocates aggregate IDs 204 for unique combinations of grouping field values. Subsequent devices, e.g., routers, may only see the aggregate ID and then perform statistical, metric aggregation based on the aggregate ID 204.

Once an aggregate ID 204 is determined by the first hop edge router 104a, either by locating the aggregate ID 204 in the mapping table 200 or by assigning a new aggregate ID 204 (which is then stored in the mapping table 200), the first hop edge router 104a may encapsulate metadata, including the aggregate ID, of the packet. Table 1 below illustrates an example of an overlay metadata format for packets including a field for the aggregate ID.

Once the second router 104b is finished with the packet, the packet may be routed back other direction packet to the first hop edge router 104a or may be forwarded to the third router 104c. The third router 104c or the first hop edge router 104a may decapsulate the packet and once again determine the flow metrics and aggregate the flow metrics with respect to the aggregate ID. In examples, the flow level overlay metrics such as, for example, jitter and delay, may be measured by time stamps in the metadata. This may be aggregated to the aggregate ID. The flow level end to end metrics such as, for example, client network delay (CND) and server network delay (SND) may be measured for TCP. These metrics may be aggregated with respect to the aggregate ID. Additionally, the overlay metric loss may be directly measured on the aggregate ID level by collecting sender and receiver aggregate ID counters.

Each of the routers 104a, 104b, 104c may export the aggregated metrics/statistics to the network controller 102 for correlation and visualization. For example, the aggregated metrics may be displayed in tables, graphs, etc. The aggregated metrics may be displayed with respect to one or more members of the grouping fields.

In configurations, after all the routers 104a, 104b, 104c have exported aggregate ID level metrics to the network controller 102, the network controller 102 may flexibly do additional aggregation based on any subset of grouping fields as post analysis. For example, a user may configure aggregation by VPN and domain (a subset of grouping fields) on the network controller 102. In such a situation, the stats/metrics of aggregate ID 3 and aggregate ID 7 may be merged, e.g., VPN 200 and domain webex.com.

Figure 3:
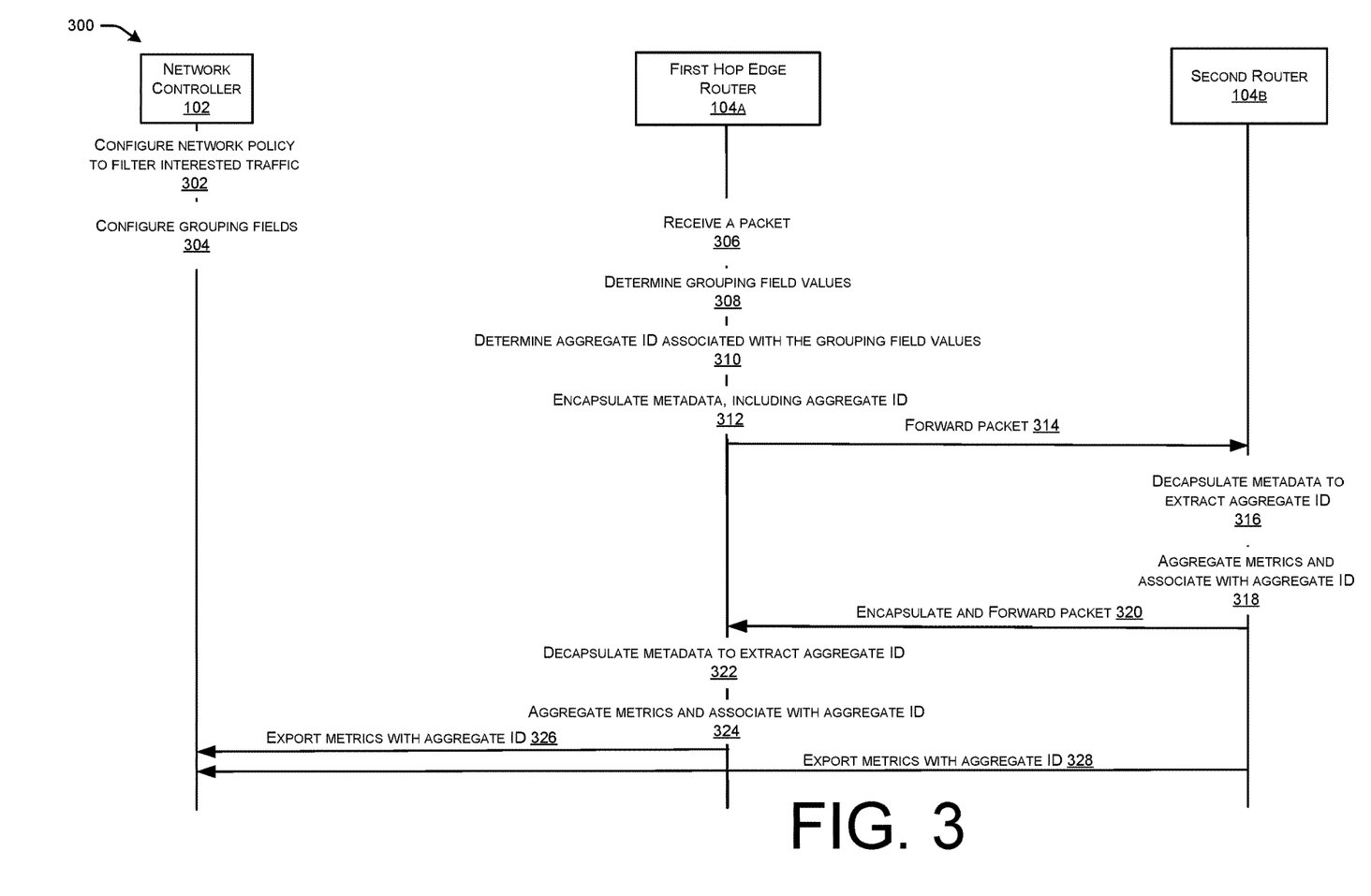
FIG. 3 schematically illustrates an example workflow of aggregating flow metrics in a network based on grouping fields and aggregate IDs, in accordance with the techniques and architecture described herein.

FIG. 3 schematically illustrates an example workflow 300 of aggregating flow metrics in a network, e.g., network 100, based on grouping fields and aggregate IDs. At 302, a network controller, e.g., network controller 102, configures network policy to filter interested traffic. At 304, the network controller configures grouping fields for packets within the network. In configurations, the grouping fields 202 may be defined by a user. The grouping fields 202 may include one or more of, for example, virtual private network (VPN), application, prefix, security group tag (SGT), domain, username, user group, etc.

TABLE 1

| 0 1 2 3 4 5 6 7 | 8 9 10 11 12 13 14 15 | 16 17 18 19 20 21 22 | 23 24 25 26 27 | 28 29 30 31 |
|---|---|---|---|---|
| SDWAN Tunnel ENCAP (IPSec or GRE) | | | | |
| Next hdr (Mdata) | Label value (represents VPN id) | | EXP S | TTL |
| Next hdr (IPv4 or IPv6) | Length(Multiple of 4 Bytes) | Version(0x1, GDOI; 0x2, SDWAN) | | Reserve |
| Length | Sub Type (Aggregate Matric) | | Aggregation ID | |
| Timestamp | | | Round Trip Delay Timestamp | |
| Payload (IPv4 hdr or IPv6 hdr) | | | | |

Once the packet is encapsulated, the packet may be forwarded to another router, e.g., second router 104b. The second router 104b may decapsulate the metadata of the packet and extract the aggregate ID 204. The second router 104b may aggregate metrics for the packet and associate the aggregate ID 204 with the metrics. The second router 104b may also hook the other direction traffic by flow table. The second router 104b may sample, e.g., follow the first hop router sample in the other direction and encapsulate metadata for the sampled packets. Other fields within the metadata may be used for measuring the flow metrics, e.g., the performance based on the flow level for each packet.

At 306, a first hop edge router, e.g., first hop edge router 104a, receives a packet. At 308, the first hop edge router filters the packet. For example, the first hop edge router may filter the traffic based upon, for example, policy classification.

At 308, the first hop edge router determines the grouping field values (also referred to herein as attribute group) of the packet. For example, after the filtering, in configurations, the first hop edge router 104a may determine the grouping field values of the packet.

At 310, the first hop edge router determines an aggregate ID associated with the grouping field values. For example, the first hop edge router 104a may dynamically maintain a mapping table, e.g., mapping table 200, for aggregate IDs for the various combination of grouping field values. Upon receipt of a packet, the first hop edge router may search the mapping table 200 for an aggregate ID 204 that corresponds to the grouping field values of the packet. If a corresponding aggregate ID 204 is not located in the mapping table 200, then the combination of grouping field values of the packet is new and the first hop edge router 104a may assign a new aggregate ID 204 to the combination of grouping field values (and store the new aggregate ID with the corresponding combination of grouping field values in the mapping table 200). Thus, the first hop edge router 104a may use an allocated aggregate ID 204 directly located in the mapping table 200 or may allocate an aggregate ID 204 for the new combination of grouping field values. In configurations, the first hop edge router 104a dynamically maintains the mapping table 200 and also exports the mapping to the network controller 102. In the example mapping table 200, the grouping fields 202 may include VPN, application, domain, SGT, username, and user group. In configurations, grouping fields may also include prefix. An aggregate ID 204 may be assigned based upon the actual values of the grouping fields 202. For example, aggregate ID 1 may be assigned to VPN 100, application cisco-webex, domain webex.com, SGT 1, username Alice and user group marketing. Aggregate ID 2 may be assigned to VPN 100, application Citrix, domain citrix.com, SGT 1, username Alice, and user group marketing. Aggregate ID 3 may be assigned to VPN 200, application cisco-webex, domain webex.com, SGT 2 username Bob, and user group engineering. In configurations, a user may flexibly customize the grouping fields via the network controller 102. When the first hop edge router 104a receives a packet that has new grouping field values, when the first hop edge router 104a searches the mapping table 200, the first hop edge router 104a will not locate a corresponding aggregate ID 204. Thus, the first hop edge router 104 may assign a new aggregate ID 204 for the particular grouping field values. For example, if the packet has VPN 200, application cisco-webex, domain webex.com, SGT 2, username Jim, and user group engineering, then the first hop edge router 104a may assign a new aggregate ID 204, e.g., aggregate ID of 7, to this new unique combination of grouping field values. Thus, on the network first hop device, the network first hop device dynamically allocates aggregate IDs 204 for unique combinations of grouping field values. Subsequent devices, e.g., routers, may only see the aggregate ID and then perform statistical, metric aggregation based on the aggregate ID 204.

At 312, the first hop edge router encapsulates the metadata, including the aggregate ID, of the packet. For example, once an aggregate ID 204 is determined by the first hop edge router 104a, either by locating the aggregate ID 204 in the mapping table 200 or by assigning a new aggregate ID 204 (which is then stored in the mapping table 200), the first hop edge router 104a may encapsulate the metadata, including the aggregate ID, of the packet.

At 314, the first hop edge router forwards the packet to a second router. For example, once the packet is encapsulated, the packet may be forwarded to another router, e.g., second router 104b.

At 316, the second router decapsulates the metadata of the packet and extracts the aggregate ID. For example, the second router 104b may decapsulate the metadata of the packet and extract the aggregate ID 204.

At 318, the second router aggregates metrics for the packet and associates the aggregate ID with the metrics. For example, the second router 104a may aggregate flow metrics for the packet and associate the aggregate ID 204 with the aggregated flow metrics. In examples, the flow level overlay metrics such as, for example, jitter and delay, may be measured by time stamps in the metadata. This may be aggregated to the aggregate ID 204. The flow level end to end metrics such as, for example, client network delay (CND) and server network delay (SND) may be measured for TCP. These metrics may be aggregated with respect to the aggregate ID. Additionally, the overlay metric loss may be directly measured on the aggregate ID level by collecting sender and receiver aggregate ID counters.

At 320, the packet is encapsulated with the same aggregate ID and routed back to the first hop edge router. For example, once the second router 104b is finished with the packet, the traffic flow's other direction packet may be routed back to the first hop edge router 104a.

At 322, the first hop edge router decapsulates the packet to extract the aggregate ID. At 324, the first hop edge router aggregates flow metrics and associates the aggregate ID with the metrics. For example, the first hop edge router 104a may decapsulate the packet and determine the flow metrics and aggregate the flow metrics with respect to the aggregate ID 204. As previously noted, in examples, the flow level overlay metrics such as, for example, jitter and delay, may be measured by time stamps in the metadata. This may be aggregated to the aggregate ID 204. The flow level end to end metrics such as, for example, client network delay (CND) and server network delay (SND) may be measured for TCP. These metrics may be aggregated with respect to the aggregate ID. Additionally, the overlay metric loss may be directly measured on the aggregate ID level by collecting sender and receiver aggregate ID counters.

At 326, the first hop edge router exports its aggregated metrics/statistics to the network controller for correlation, visualization, and possible further aggregation. At 328, the second router exports its aggregated metrics/statistics to the network controller for correlation, visualization, and possible further aggregation. For example, the routers 104a and 104b may export the aggregated metrics/statistics to the network controller 102 for correlation and visualization. For example, the aggregated metrics may be displayed in tables, graphs, etc. The aggregated metrics may be displayed with respect to one or more members of the grouping fields. In configurations, after all the routers 104a and 104b have exported aggregate ID level metrics to the network controller 102, the network controller 102 may flexibly do additional aggregation based on any subset of grouping fields as post analysis. For example, a user may configure aggregation by VPN and domain (a subset of grouping fields) on the network controller 102. In such a situation, referring to mapping table 200, the stats/metrics of aggregate ID 3 and aggregate ID 7 may be merged, e.g., VPN 200 and domain webex.com.

Figure 4:
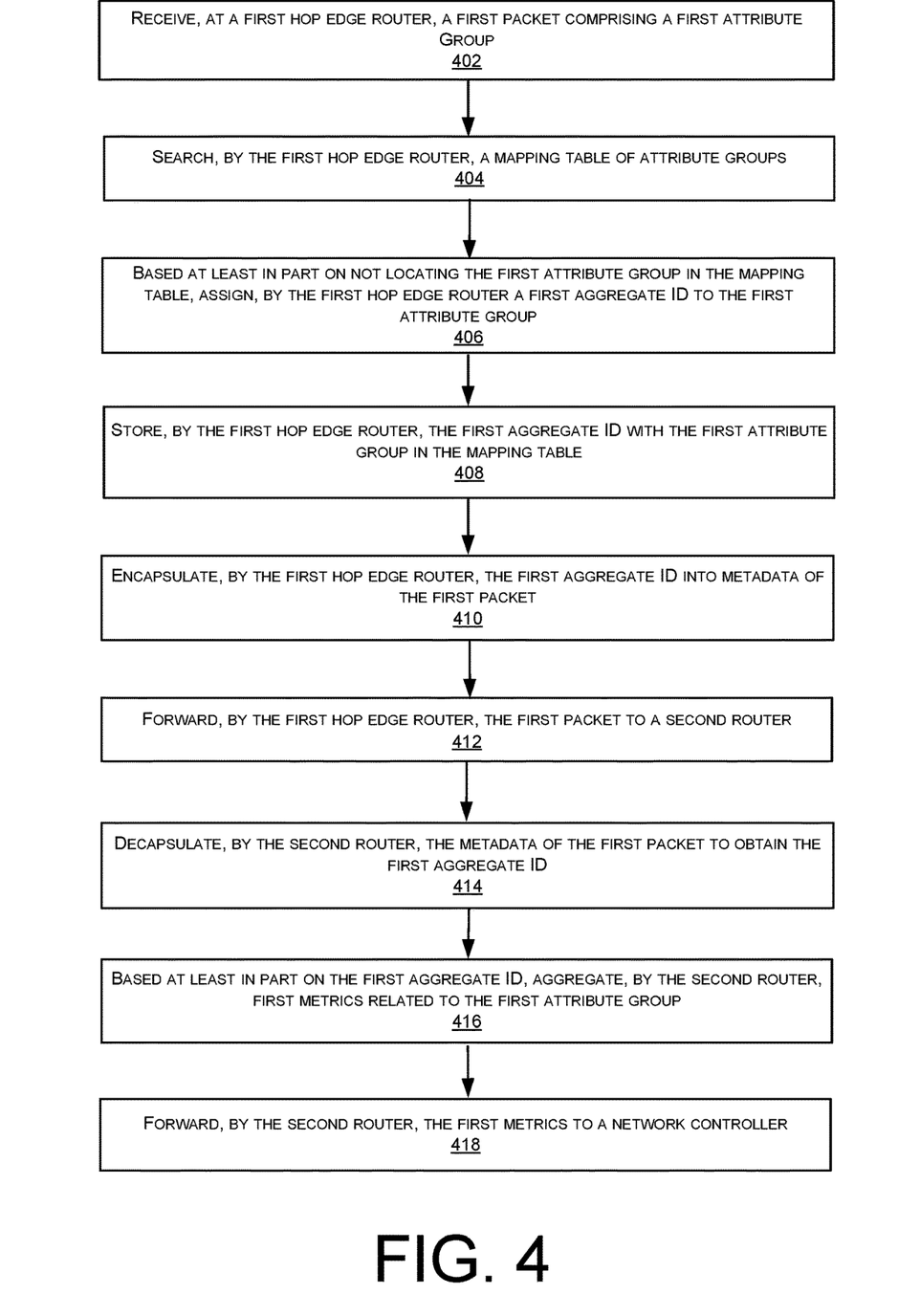
FIG. 4 illustrates a flow diagram of an example method for aggregating flow metrics in a network based on grouping fields and aggregate IDs, in accordance with the techniques and architecture described herein.

FIG. 4 illustrates a flow diagram of an example method 400 and illustrates aspects of the functions performed at least partly by network devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for aggregating flow metrics in a network, e.g., network 100, based on grouping fields and aggregate IDs. In some examples, the method 400 may be performed by a system comprising one or more processors and one or more non-transitory computer-readable media storing computer-executable instructions that, when executed by the one or more processors, cause the one or more processors to perform the method 400.

At 402, a first hop edge router of a network receives a first packet comprising a first attribute group. In configurations, the attributes of the first attribute group relate to transmission source attributes for the first packet and may correspond to a combination of grouping field values, as described herein. For example, the first hop edge router 104a may receive a packet. In configurations, the first hop edge router 104a may filter the packet. For example, the first hop edge router 104a may filter the traffic based upon, for example, policy classification.

At 404, the first hop edge router of the network searches a mapping table of attribute groups. In configurations, the mapping table of attribute groups stores attribute groups and a corresponding aggregate identification (ID) corresponding to a particular attribute group. For example, the first hop edge router 104a may dynamically maintain a mapping table, e.g., mapping table 200, for aggregate IDs 204 for the various combination of grouping field values. Upon receipt of a packet, the first hop edge router 104a may search the mapping table 200 for an aggregate ID 204 that corresponds to the grouping field values of the packet.

At 406, based at least in part on not locating the first attribute group in the mapping table, the first hop edge router of the network assigns a first aggregate ID to the first attribute group. For example, if a corresponding aggregate ID 204 is not located in the mapping table 200, then the combination of grouping field values of the packet is new and the first hop edge router 104a may assign a new aggregate ID 204 to the combination of grouping field values (and store the new aggregate ID 204 with the corresponding combination of grouping field values in the mapping table 200). Thus, the first hop edge router 104a may use an allocated aggregate ID 204 directly located in the mapping table 200 or may allocate an aggregate ID 204 for the new combination of grouping field values. In configurations, the first hop edge router 104a dynamically maintains the mapping table 200 and also exports the mapping to the network controller 102. In the example mapping table 200, the grouping fields 202 may include VPN, application, domain, SGT, username, and user group. In configurations, grouping fields may also include prefix. An aggregate ID 204 may be assigned based upon the actual values of the grouping fields 202.

At 408, the first hop edge router of the network stores the first aggregate ID with the first attribute group in the mapping table. For example, the first hop edge router 104a may store the aggregate ID 204 with the first attribute group (combination of grouping field values) in the mapping table 200.

At 410, the first hop edge router of the network encapsulates the first aggregate ID into metadata of the first packet. For example, the first hop edge router 104a may encapsulate the aggregate ID 204 into metadata of the packet.

At 412, the first hop edge router of the network forwards the first packet to a second router of the network. For example, the first hop edge router 104a may forward the packet to the second router 104b.

At 414, the second router of the network decapsulates the metadata of the first packet to obtain the first aggregate ID. For example, the second router 104b may decapsulate the metadata of the packet to obtain the aggregate ID 204.

At 416, based at least in part on the first aggregate ID, the second router of the network aggregates first metrics related to the first attribute group. For example, the first hop edge router 104a may decapsulate the packet and determine the flow metrics and aggregate the flow metrics with respect to the aggregate ID 204. In examples, the flow level overlay metrics such as, for example, jitter and delay, may be measured by time stamps in the metadata. This may be aggregated to the aggregate ID 204. The flow level end to end metrics such as, for example, client network delay (CND) and server network delay (SND) may be measured for TCP. These metrics may be aggregated with respect to the aggregate ID. Additionally, the overlay metric loss may be directly measured on the aggregate ID level by collecting sender and receiver aggregate ID counters.

At 418, the second router of the network forwards the first metrics to a network controller. For example, the router 104b may export the aggregated metrics/statistics to the network controller 102 for correlation and visualization. For example, the aggregated metrics may be displayed in tables, graphs, etc. The aggregated metrics may be displayed with respect to one or more members of the grouping fields. In configurations, after all the routers 104a and 104b have exported aggregate ID level metrics to the network controller 102, the network controller 102 may flexibly do additional aggregation based on any subset of grouping fields as post analysis. For example, a user may configure aggregation by VPN and domain (a subset of grouping fields) on the network controller 102. In such a situation, referring to mapping table 200, the stats/metrics of aggregate ID 3 and aggregate ID 7 may be merged, e.g., VPN 200 and domain webex.com.

Thus, the techniques and architecture described herein provide a first hop edge router dynamically allocating an aggregate ID for a unique combination of grouping key fields (grouping fields), e.g., VPN, application, domain, SGT, user name, user group, prefix, etc. The grouping fields may be configured by a user as per the user's interest). The aggregate ID may be encapsulated into overlay metadata. In subsequent routers of the network, the routers may directly aggregate flow metrics at the aggregate ID level. A network controller may collect the aggregate ID level metrics from all devices. For visualization, the network controller may expand the corresponding grouping key fields by the aggregate ID to the grouping fields mapping from the first hop edge router. In this way, there is flexibility of flow level insight sampling vs. app level's aggregation insight for all traffic flows.

Figure 5:
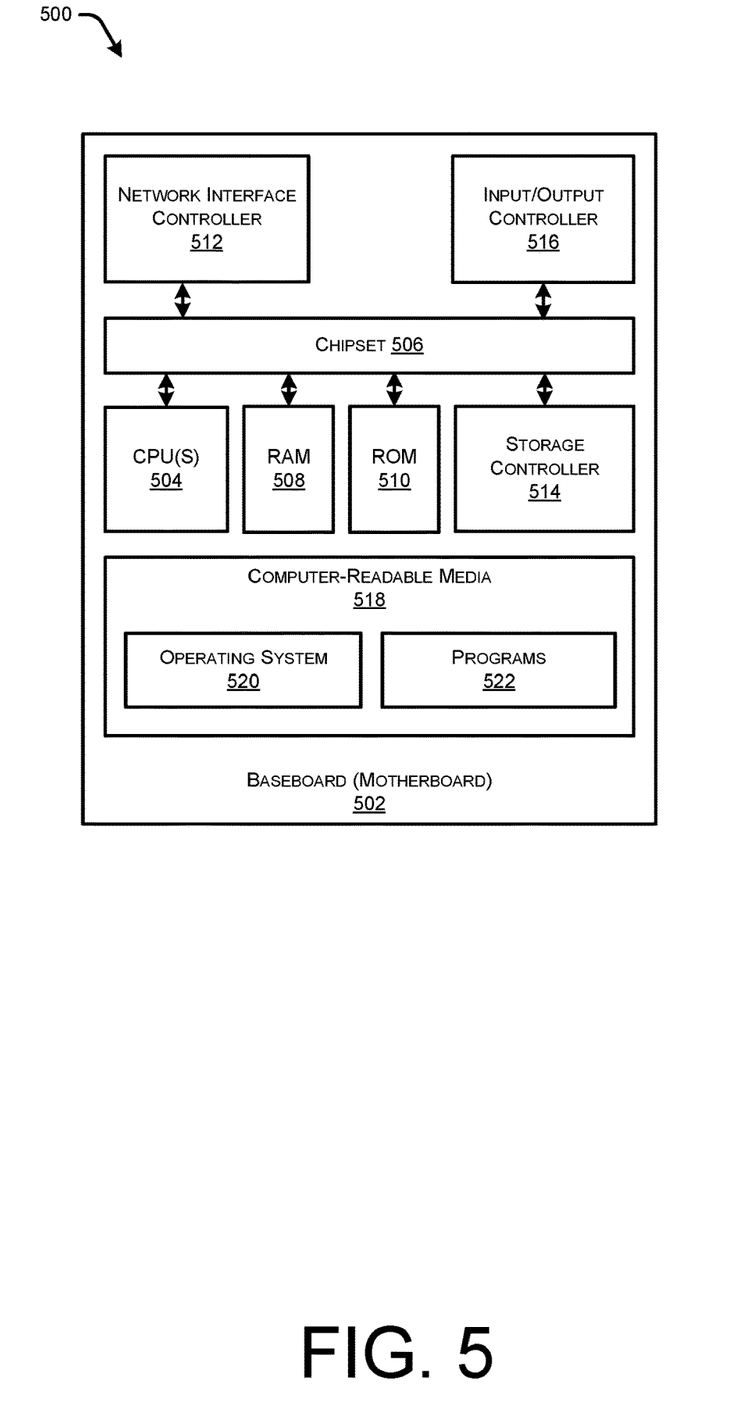
FIG. 5 is a computer architecture diagram showing an example computer hardware architecture for implementing a device that can be utilized to implement aspects of the various technologies presented herein.

FIG. 5 shows an example computer architecture for a computing device 500 capable of executing program components for implementing the functionality described above. In configurations, one or more of the computing devices 500 may be used to implement one or more of the components of FIGS. 1-4. The computer architecture shown in FIG. 5 illustrates a conventional server computer, router, switch, workstation, desktop computer, laptop, tablet, network appliance, e-reader, smartphone, or other computing device, and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network, such as the network 100. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving, at a first hop edge router of a network, a first packet comprising a first attribute group, wherein attributes of the first attribute group relate to transmission source attributes for the first packet;
    searching, by the first hop edge router of the network, a mapping table of attribute groups, wherein the mapping table of attribute groups stores attribute groups and a corresponding aggregate identification (ID) corresponding to a particular attribute group;
    based at least in part on not locating the first attribute group in the mapping table, assigning, by the first hop edge router of the network, a first aggregate ID to the first attribute group;
    storing, by the first hop edge router of the network, the first aggregate ID with the first attribute group in the mapping table;
    encapsulating, by the first hop edge router of the network, the first aggregate ID into metadata of the first packet;
    forwarding, by the first hop edge router of the network, the first packet to a second router of the network;
    decapsulating, by the second router of the network, the metadata of the first packet to obtain the first aggregate ID;
    based at least in part on the first aggregate ID, aggregating, by the second router of the network, first metrics related to the first attribute group;
    hooking, by the second router, on a same traffic flow while using the same aggregate ID for traffic flow's other direction traffic; and
    forwarding, by the second router of the network, the first metrics to a network controller.

2. The method of claim 1, further comprising:
    receiving, by the first hop edge router from the second router, the first packet;
    aggregating, by the first hop edge router of the network, second metrics related to the first attribute group; and
    forwarding, by the first hop edge router, the second metrics to the network controller.

3. The method of claim 2, further comprising:
    encapsulating, by the second router of the network, the first aggregate ID into metadata of the first packet;
    forwarding, by the second router of the network, the first packet to a third router of the network;
    decapsulating, by the third router of the network, the metadata of the first packet to obtain the first aggregate ID;
    based at least in part on the first aggregate ID, aggregating, by the third router of the network, third metrics related to the first attribute group; and
    forwarding, by the third router, the third metrics to the network controller.

4. The method of claim 3, further comprising:
    correlating, by the network controller, the first metrics, second metrics, and third metrics.

5. The method of claim 1, further comprising:
    receiving, at the first hop edge router of the network, a second packet comprising a second attribute group, wherein attributes of the second attribute group relate to transmission source attributes for the second packet;
    searching, by the first hop edge router of the network, the mapping table of attribute groups;
    based at least in part on locating the second attribute group in the mapping table, encapsulating, by the first hop edge router of the network, a second aggregate ID into metadata of the second packet from the mapping table, wherein the second aggregate ID corresponds to the second attribute group;
    forwarding, by the first hop edge router of the network, the second packet to the second router of the network;
    decapsulating, by the second router of the network, the metadata of the second packet to obtain the second aggregate ID; and based at least in part on the second aggregate ID, aggregating, by the second router of the network, second metrics related to the second attribute group.

6. The method of claim 1, wherein the attributes comprise one or more of virtual private network (VPN), application, domain, security group tag (SGT), username, or user group.

7. The method of claim 5, wherein the first and second metrics comprise one or more of jitter, delay, client network delay, server network delay, or packet loss.

8. The method of claim 7, wherein the first and second metrics are measured by at least one of timestamps or counters.

9. A system comprising:
one or more processors; and
one or more non-transitory computer-readable media storing computer-executable instructions that, when executed by the one or more processors, cause the one or more processors to perform actions comprising:
receiving, at a first hop edge router of a network, a first packet comprising a first attribute group, wherein attributes of the first attribute group relate to transmission source attributes for the first packet;
searching, by the first hop edge router of the network, a mapping table of attribute groups, wherein the mapping table of attribute groups stores attribute groups and a corresponding aggregate identification (ID) corresponding to a particular attribute group;
based at least in part on not locating the first attribute group in the mapping table, assigning, by the first hop edge router of the network, a first aggregate ID to the first attribute group;
storing, by the first hop edge router of the network, the first aggregate ID with the first attribute group in the mapping table;
encapsulating, by the first hop edge router of the network, the first aggregate ID into metadata of the first packet;
forwarding, by the first hop edge router of the network, the first packet to a second router of the network;
decapsulating, by the second router of the network, the metadata of the first packet to obtain the first aggregate ID;
based at least in part on the first aggregate ID, aggregating, by the second router of the network, first metrics related to the first attribute group;
hooking, by the second router, on a same traffic flow while using the same aggregate ID for traffic flow's other direction traffic; and
forwarding, by the second router of the network, the first metrics to a network controller.

10. The system of claim 9, wherein the actions further comprise:
receiving, by the first hop edge router from the second router, the first packet;
aggregating, by the first hop edge router of the network, second metrics related to the first attribute group; and
forwarding, by the first hop edge router, the second metrics to the network controller.

11. The system of claim 10, wherein the actions further comprise:
encapsulating, by the second router of the network, the first aggregate ID into metadata of the first packet;
forwarding, by the second router of the network, the first packet to a third router of the network;
decapsulating, by the third router of the network, the metadata of the first packet to obtain the first aggregate ID;
based at least in part on the first aggregate ID, aggregating, by the third router of the network, third metrics related to the first attribute group; and
forwarding, by the third router, the third metrics to the network controller.

12. The system of claim 11, wherein the actions further comprise:
correlating, by the network controller, the first metrics, the second metrics, and the third metrics.

13. The system of claim 9, wherein the actions further comprise:
receiving, at the first hop edge router of the network, a second packet comprising a second attribute group, wherein attributes of the second attribute group relate to transmission source attributes for the second packet;
searching, by the first hop edge router of the network, the mapping table of attribute groups;
based at least in part on locating the second attribute group in the mapping table, encapsulating, by the first hop edge router of the network, a second aggregate ID into metadata of the second packet from the mapping table, wherein the second aggregate ID corresponds to the second attribute group;
forwarding, by the first hop edge router of the network, the second packet to the second router of the network;
decapsulating, by the second router of the network, the metadata of the second packet to obtain the second aggregate ID; and
based at least in part on the second aggregate ID, aggregating, by the second router of the network, second metrics related to the second attribute group.

14. The system of claim 9, wherein the attributes comprise one or more of virtual private network (VPN), application, domain, security group tag (SGT), username, or user group.

15. The system of claim 13, wherein the first and second metrics comprise one or more of jitter, delay, client network delay, server network delay, or packet loss.

16. The system of claim 15, wherein the first and second metrics are measured by at least one of timestamps or counters.

17. One or more non-transitory computer-readable media storing computer-executable instructions that, when executed by one or more processors, cause the one or more processors to perform actions comprising:
receiving, at a first hop edge router of a network, a first packet comprising a first attribute group, wherein attributes of the first attribute group relate to transmission source attributes for the first packet;
searching, by the first hop edge router of the network, a mapping table of attribute groups, wherein the mapping table of attribute groups stores attribute groups and a corresponding aggregate identification (ID) corresponding to a particular attribute group;
based at least in part on not locating the first attribute group in the mapping table, assigning, by the first hop edge router of the network, a first aggregate ID to the first attribute group;
storing, by the first hop edge router of the network, the first aggregate ID with the first attribute group in the mapping table;
encapsulating, by the first hop edge router of the network, the first aggregate ID into metadata of the first packet;
forwarding, by the first hop edge router of the network, the first packet to a second router of the network;
decapsulating, by the second router of the network, the metadata of the first packet to obtain the first aggregate ID;

based at least in part on the first aggregate ID, aggregating, by the second router of the network, first metrics related to the first attribute group;

hooking, by the second router, on a same traffic flow while using the same aggregate ID for traffic flow's other direction traffic; and forwarding, by the second router of the network, the first metrics to a network controller.

18. The one or more non-transitory computer-readable media of claim 17, wherein the actions further comprise:

receiving, by the first hop edge router from the second router, the first packet;

aggregating, by the first hop edge router of the network, second metrics related to the first attribute group; and forwarding, by the first hop edge router, the second metrics to the network controller.

19. The one or more non-transitory computer-readable media of claim 18, wherein the actions further comprise:

encapsulating, by the second router of the network, the first aggregate ID into metadata of the first packet;

forwarding, by the second router of the network, the first packet to a third router of the network;

decapsulating, by the third router of the network, the metadata of the first packet to obtain the first aggregate ID;

based at least in part on the first aggregate ID, aggregating, by the third router of the network, third metrics related to the first attribute group; and forwarding, by the third router, the third metrics to the network controller.

20. The one or more non-transitory computer-readable media of claim 17, wherein the actions further comprise:

receiving, at the first hop edge router of the network, a second packet comprising a second attribute group, wherein attributes of the second attribute group relate to transmission source attributes for the second packet;

searching, by the first hop edge router of the network, the mapping table of attribute groups;

based at least in part on locating the second attribute group in the mapping table, encapsulating, by the first hop edge router of the network, a second aggregate ID into metadata of the second packet from the mapping table, wherein the second aggregate ID corresponds to the second attribute group;

forwarding, by the first hop edge router of the network, the second packet to the second router of the network;

decapsulating, by the second router of the network, the metadata of the second packet to obtain the second aggregate ID; and based at least in part on the second aggregate ID, aggregating, by the second router of the network, second metrics related to the second attribute group.

* * * * *